United States Patent
Chen et al.

(10) Patent No.: US 10,268,658 B2
(45) Date of Patent: *Apr. 23, 2019

(54) PAGE LOADING METHOD AND SYSTEM, AND COMPUTER-READABLE STORAGE MEDIUM

(71) Applicant: TENCENT TECHNOLOGY (SHENZHEN) COMPANY LIMITED, Shenzhen (CN)

(72) Inventors: Yingping Chen, Shenzhen (CN); Dingfen Long, Shenzhen (CN); Xueheng Guo, Shenzhen (CN); Jing Li, Shenzhen (CN); Hao Wu, Shenzhen (CN); Hengbing Liu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 15/993,436

(22) Filed: May 30, 2018

(65) Prior Publication Data

US 2018/0276228 A1    Sep. 27, 2018

Related U.S. Application Data

(63) Continuation of application No. 14/726,411, filed on May 29, 2015, now Pat. No. 10,013,498, which is a
(Continued)

(30) Foreign Application Priority Data

Nov. 29, 2012 (CN) .......................... 2012 1 0499558

(51) Int. Cl.
*G06F 17/00* (2019.01)
*G06F 16/958* (2019.01)
(Continued)

(52) U.S. Cl.
CPC ........ *G06F 16/958* (2019.01); *G06F 16/9574* (2019.01); *G06F 17/2247* (2013.01); *H04L 67/02* (2013.01); *H04L 67/18* (2013.01)

(58) Field of Classification Search
CPC ........... G06F 17/2247; G06F 17/30896; G06F 17/3089; G06F 17/30905; G06F 16/958; G06F 16/9574; H04L 67/02; H04L 67/18
(Continued)

(56) References Cited

U.S. PATENT DOCUMENTS 7,392,488 B2 *  6/2008  Card ................. G06F 17/30873
                                                707/E17.111
8,806,327 B2    8/2014  Morris
(Continued)

FOREIGN PATENT DOCUMENTS

CN    101782905 A    7/2010
CN    102117290 A    7/2011
(Continued)

OTHER PUBLICATIONS

Wang, Shuo, et al., Implementation of Mass Datas Fast Loading on Web-Based Tree Structure, Computer Engineering and Applications, Sep. 30, 2008, pp. 165-167, 171, China.

*Primary Examiner* — Scott T Baderman
*Assistant Examiner* — Hassan Mrabi
(74) *Attorney, Agent, or Firm* — Anova Law Group, PLLC

(57) ABSTRACT

A page loading method includes acquiring an instruction of loading page content, acquiring positioning information of a current display area of a page, acquiring page content corresponding to the current display area according to the positioning information, loading the page content corresponding to the current display area, and performing a page content pre-loading for a predetermined area adjacent to the
(Continued)

current display area. The page content pre-loading includes determining page content within a predetermined number of pixels above and below the current display area, and pre-loading the page content within the predetermined number of pixels. The page content pre-loading further includes determining a browsing trend of the page according to operation trajectory tracking, and acquiring and pre-loading page content of a next display area according to the browsing trend.

20 Claims, 8 Drawing Sheets

Related U.S. Application Data continuation of application No. PCT/CN2013/084918, filed on Oct. 9, 2013.

(51) Int. Cl.
  *G06F 16/957* (2019.01)
  *G06F 17/22* (2006.01)
  *H04L 29/08* (2006.01)

(58) Field of Classification Search
  USPC .......................................................... 715/234
  See application file for complete search history.

(56) References Cited

U.S. PATENT DOCUMENTS

| | | | |
|---|---|---|---|
| 2004/0133848 A1 | 7/2004 | Hunt et al. | |
| 2005/0177401 A1* | 8/2005 | Koeppel | G06Q 30/02 705/4 |
| 2009/0326966 A1* | 12/2009 | Callaghan | G06Q 30/02 705/1.1 |
| 2010/0281481 A1 | 11/2010 | Rainisto et al. | |
| 2012/0254729 A1 | 10/2012 | Wan | |
| 2013/0100379 A1* | 4/2013 | Haynes | G02F 1/133308 349/62 |

FOREIGN PATENT DOCUMENTS

| | | |
|---|---|---|
| CN | 102346782 A | 2/2012 |
| CN | 102591954 A | 7/2012 |
| WO | 2008043236 A1 | 4/2008 |

\* cited by examiner

PAGE LOADING METHOD AND SYSTEM, AND COMPUTER-READABLE STORAGE MEDIUM

CROSS-REFERENCES TO RELATED APPLICATIONS

This application is a continuation of application Ser. No. 14/726,411, filed on May 29, 2015, which is a continuation of PCT Application No. PCT/CN2013/084918, filed on Oct. 9, 2013, which claims priority to Chinese Patent Application No. CN201210499558X, filed on Nov. 29, 2012, the entire contents of all of which are incorporated herein by reference.

FIELD OF THE TECHNOLOGY

The present disclosure generally relates to the field of web page information processing technologies, and more particularly, relates to a page loading method, a page loading system, and a computer-readable storage medium.

BACKGROUND OF THE DISCLOSURE

In a web page loading method, page content is loaded and displayed by scrolling, in combination with dynamically creating and destroying nodes. When loading and displaying page content by scrolling, loading and displaying content are performed in a certain order of first loading a start page content and displaying the start page content in a browse window. As a user drags a scroll bar and a content display area moves downward gradually, corresponding page data may be gradually acquired from the background, and then loaded and displayed.

As shown in FIG. 1, after the user triggers opening of a page, page data of a default initial screen is loaded first, that is, areas A and B; then, as the user drags a scroll bar downward to browse data, data of areas C, D, E, and F is loaded and displayed one after another in the certain order.

When dynamically creating and destroying nodes, content nodes included in page content within a display area of a browse window are dynamically created. While dynamically destroying content nodes out of the display area of the browse window, only a placeholder node is retained for identifying page content displayed previously.

As shown in FIG. 2, after the user triggers opening of a page, page data of a default initial screen is loaded first, that is, areas A and B, and content nodes of the areas A and B are created; then, as the user drags a scroll bar downward to browse data, areas C and D are loaded in order, content nodes of the areas C and D are created, and at the same time, the content nodes previously displayed in the areas A and B are destroyed; as the user continues to drag the scroll bar downward to browse data, areas E and F are loaded in the order, content nodes of the areas E and F are created, and at the same time, the content nodes previously displayed in the areas C and D are destroyed.

However, such page loading method can only load page content in a certain order with a single direction. If the user needs to browse other page content after the start page, the user needs to wait until loading of all page content before the desired page content is completed. For example, in FIG. 1, if the user needs to browse page content of areas E and F, the user needs to wait until loading of page content of the previous areas A, B, C and D is completed, and then, the page content of the areas E and F can be loaded, which is time-consuming and slows down page loading, and fails to implement random access to content of the page and content searching and locating.

SUMMARY

An objective of the present disclosure is to provide a page loading method and a page loading system and a non-transitory computer-readable storage medium, that allow quick loading of specified page content according to a user instruction, According to one aspect of the present disclosure, a page loading method is provided by acquiring an instruction of loading page content, acquiring positioning information of a current display area of the page, and acquiring page content corresponding to the current display area according to the positioning information; and loading the page content corresponding to the current display area.

According to one aspect of the present disclosure, a page loading system is provided. The page loading system includes an instruction acquiring module, configured to acquire an instruction of loading page content; a content acquiring module, configured to acquire positioning information of a current display area of the page, and acquire page content corresponding to the current display area according to the positioning information; and a content loading module, configured to load the page content corresponding to the current display area.

According to one aspect of the present disclosure, a non-transitory computer-readable storage medium including a computer readable program is provided. When being executed, the computer readable program causes a computer to implement the disclosed page loading method.

In the page loading method and system in present disclosure, positioning information of a current display area of a page is acquired; and page content corresponding to the current display area is acquired for loading from all page content to be loaded. An area selected by a user may be loaded with a high priority, without taking time to wait until loading of all previous page content is completed, which improves a speed of loading specific page content, and can implement operations such as random access to content of a page and content searching and locating.

BRIEF DESCRIPTION OF THE DRAWINGS

The following drawings are merely examples for illustrative purposes according to various disclosed embodiments and are not intended to limit the scope of the present disclosure. The embodiments of the present invention are described below with reference to the accompanying drawings. In these accompanying drawings.

DESCRIPTION OF EMBODIMENTS

Reference will now be made in detail to exemplary embodiments of the disclosure, which are illustrated in the accompanying drawings. Wherever possible, the same reference numbers will be used throughout the drawings to refer to the same or like parts.

Figure 1:
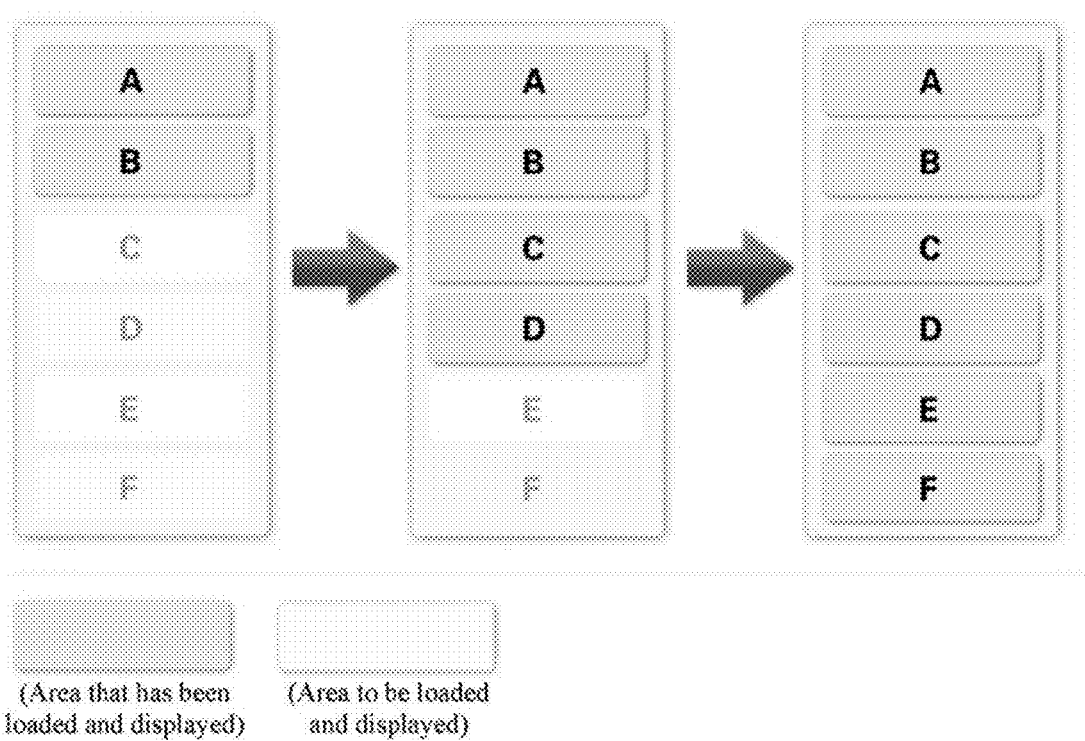
FIG. 1 and FIG. 2 are schematic diagrams of a conventional page loading method.
Figure 2:
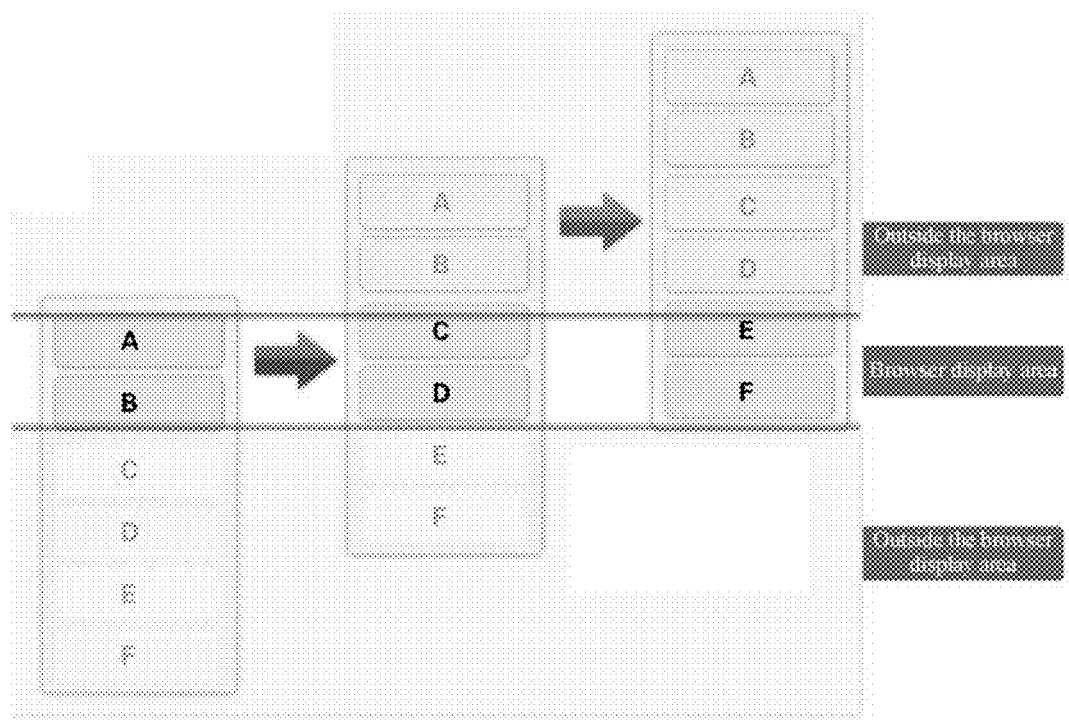
Figure 3:
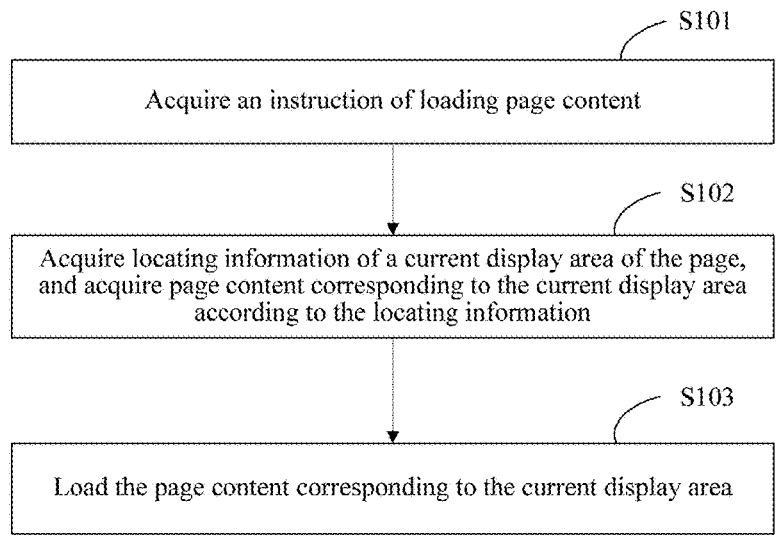
FIG. 3 is a schematic flowchart of a first exemplary implementation manner of a page loading method according to various embodiments of the present disclosure.

FIG. 3 is a schematic flowchart of a first exemplary implementation manner of a page loading method according to various embodiments of the present disclosure. The page loading method of the first implementation manner includes the following steps.

S101: Acquire an instruction of loading page content.

S102: Acquire positioning information of a current display area of the page, and acquire page content corresponding to the current display area according to the positioning information.

S103: Load the page content corresponding to the current display area. For example, the page content corresponding to the current display area can be selectively loaded with higher priority than other pages to be loaded without acquiring positioning information thereof.

In Step S101, a user-triggered instruction of loading page content may be acquired and received.

Loading of the page content includes loading the page by a user-end browser and loading specific data at a web page end. The instruction of loading the page content is a signal instruction triggered by a user and for loading a corresponding page or page content. For example, the user clicks a corresponding web page link on a web page, or opens an indication interface of a specific application service.

In Step S102, corresponding page content according to the current display area is acquired.

The positioning information of the current display area of the page is used for opening location information of a display area, of a browse window (such as a browser window or a web page window) of the page, in the page to be loaded.

Preferably, a scroll bar location of the current browse window and the width and height of a display area of the current browse window are acquired as the positioning information of the current display area. For example, if the scroll bar location of the current browse window is the $3555^{th}$ pixel line, and the window has a width of 500 pixels and a height of 400 pixels, content, that covers 250 pixel lines above the $3555^{th}$ pixel line, and 250 pixel lines below the $3555^{th}$ pixel line, and has a width of 500 pixels in the page to be loaded, is acquired and displayed. A person skilled in the art may also acquire the positioning information of the current display area of the page by using other known methods other than the method based on the scroll bar location.

In Step S103, the acquired page content is loaded.

An operation of loading the page content is mainly acquiring data included in the page content corresponding to the current display area, and displaying the data as a corresponding content node, such as a picture, a text, an icon, and/or a network link.

In the page loading method in present disclosure, positioning information of a current display area of a page is acquired; and page content corresponding to the current display area is acquired for loading from all page content to be loaded. An area selected by a user may be loaded with a high priority, without taking time to wait until loading of all previous page content is completed, which improves a speed of loading specific page content, and can implement operations such as random access to content of the page and content searching and locating.

Figure 4:
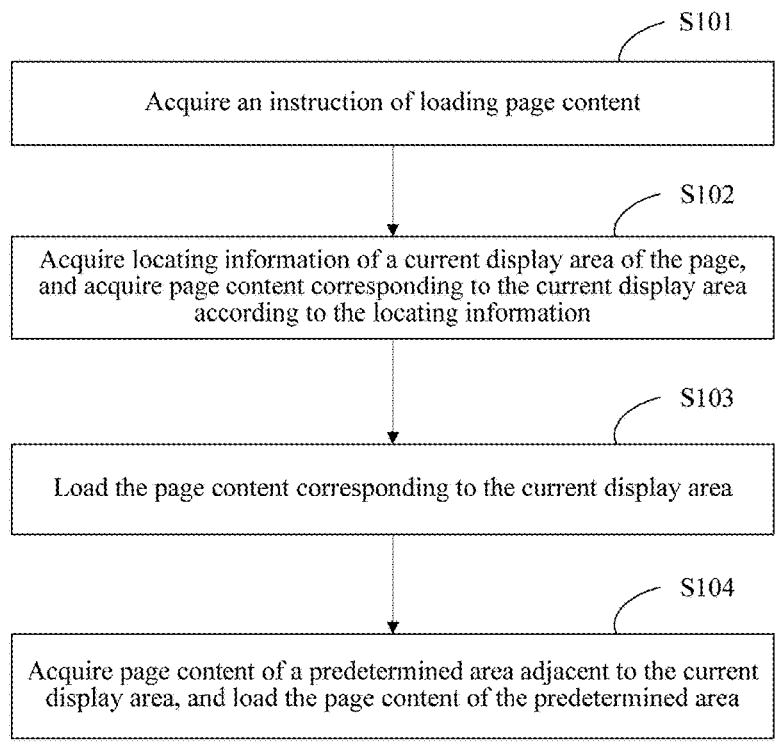
FIG. 4 is a schematic flowchart of a second exemplary implementation manner of a page loading method according to various embodiments of the present disclosure.

The following is a second exemplary implementation manner of a page loading method in the present disclosure. FIG. 4 is a schematic flowchart of a second implementation manner of a page loading method according to various embodiments of the present disclosure.

The page loading method of the second implementation manner is basically the same as that of the first implementation manner, and the main difference lies in that the page loading method of the second implementation manner further includes the following steps.

S104: Acquire page content of a predetermined area adjacent to the current display area, and load the page content of the predetermined area.

In this implementation manner, the page content corresponding to the current display area is loaded, and additionally, the page content of the predetermined area adjacent to the current display area is pre-loaded. If the user needs to continue to browse page content of an adjacent area after browsing the page content corresponding to the current display area, the pre-loaded page content may be displayed quickly for the user to browse, thereby improving a speed of loading and browsing a page or desired page content.

There may be multiple manners for pre-loading page content, including: for example, acquiring and loading page content of a plurality of pixels that is adjacent to the current display area and is above and/or below the current display area; and/or, acquiring and loading page content of a plurality of pixels that is adjacent to the current display area and is left and/or right to the current display area.

Figure 5:
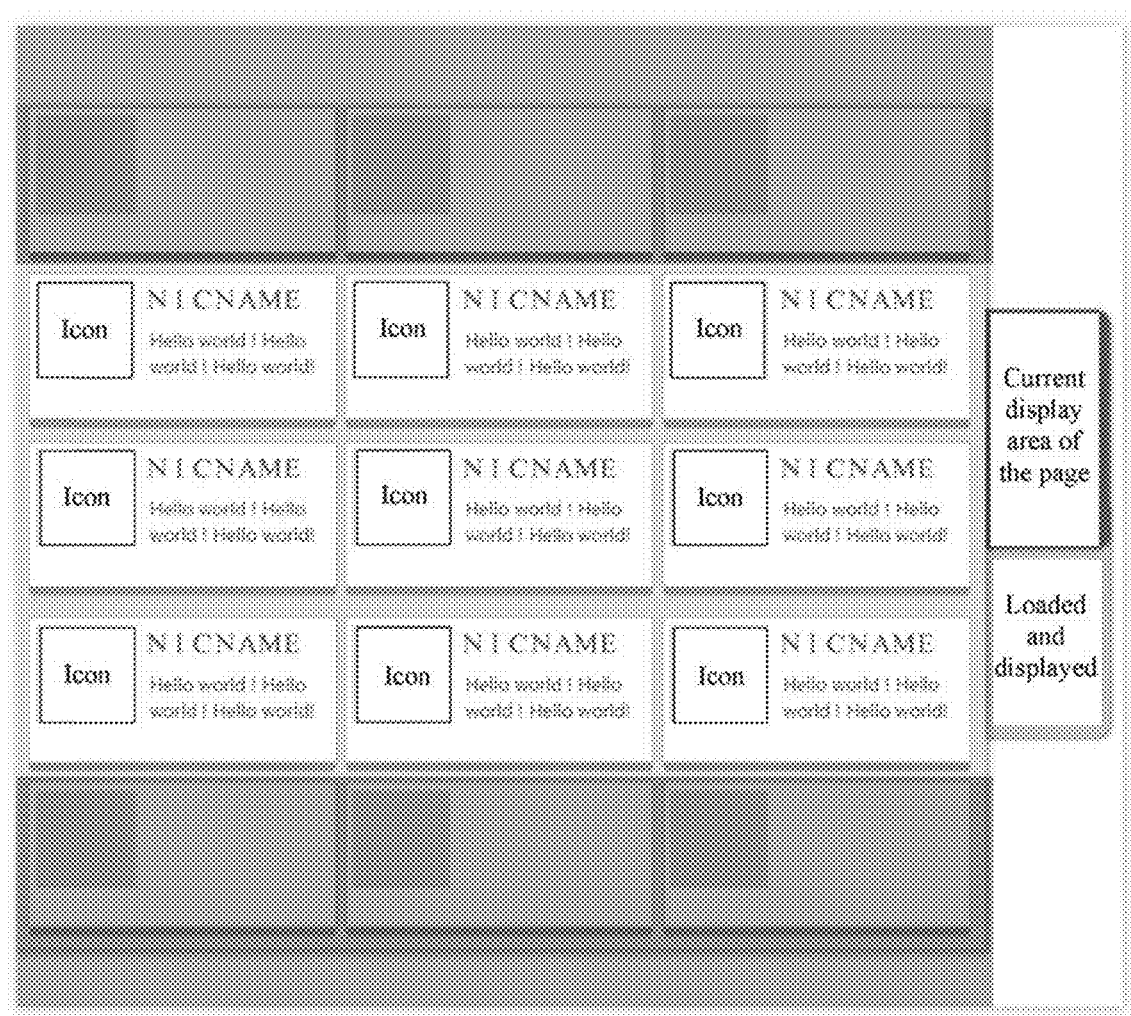
FIG. 5 is a schematic diagram of an example of the second implementation manner of the page loading method according to various embodiments of the present disclosure.

For example, generally, after the page content corresponding to the current display area is loaded, page content within 200 pixels that are adjacent to the current display area and is above and below the current display area is further pre-loaded, so as to be displayed quickly when the user needs to browse corresponding content. As shown in FIG. 5, areas adjacent to the current display area and above and below the current display area are all pre-loaded.

When the above described pre-loading is performed, areas to be pre-loaded may also be selected by determining a trend according to operation trajectory tracking, that is: acquiring, according to a current browsing order of the page, page content of a plurality of pixels of a next display area adjacent to the current display area.

For example, if the user drags a scroll bar to browse in a top-down order, and the current display area corresponds to page content at a location P, the user is going to view page content at a next location P+1 according to a current operation trend of the user, and therefore, the page content at the location P+1 is pre-loaded in advance. The page content of an adjacent area is pre-loaded, so that the user can browse the page content smoothly.

Figure 6:
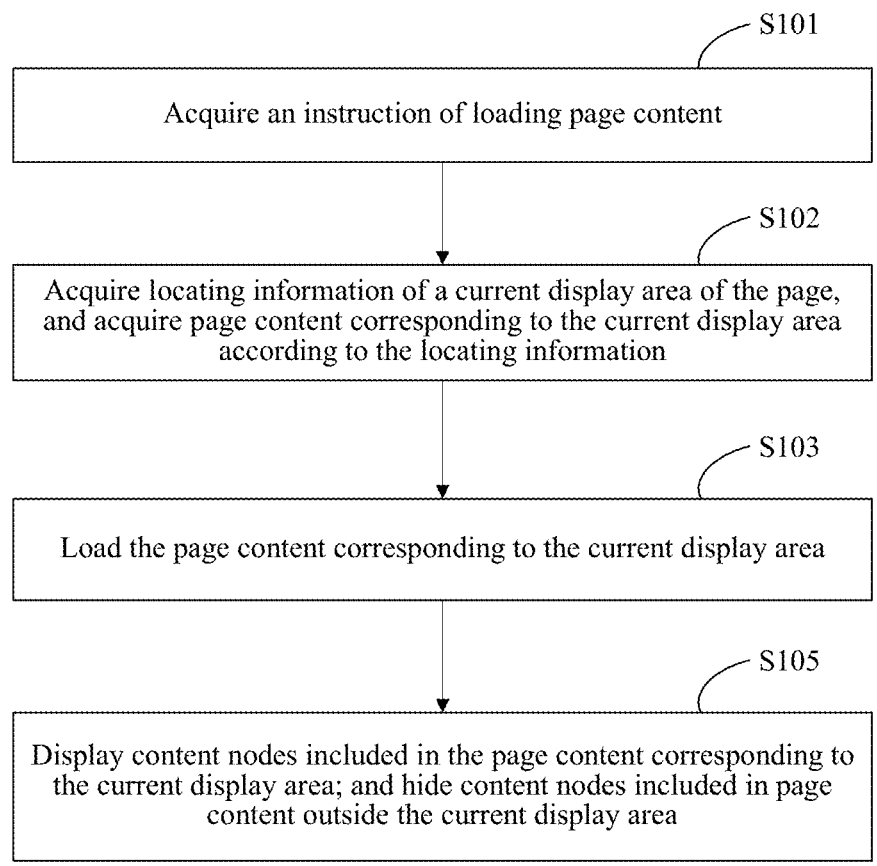
FIG. 6 is a schematic flowchart of a third exemplary implementation manner of a page loading method according to various embodiments of the present disclosure.

The following is a third implementation manner of a page loading method in the present disclosure. FIG. 6 is a schematic flowchart of a third exemplary implementation manner of a page loading method according to various embodiments of the present disclosure. The page loading method of the third implementation manner is basically the same as that of the first and the second implementation manner, and the main difference lies in that: after the corresponding page content is loaded, the page loading method of the third implementation manner further includes the following step.

S105: Display content nodes included in the page content corresponding to the current display area; and hide content nodes included in page content outside the current display area.

For a web page, like deleting content nodes, hiding unnecessary content nodes can also reduce memory and CPU occupied by the page. Because hidden nodes of a page do not exist in a render tree of the current page, a browser does not need to render the hidden nodes, for example, the browser does not need to calculate the height and width thereof, or set a display color.

Therefore, only content nodes in the current display area are displayed, and content nodes outside the current display area are hidden, which can reduce memory and CPU occupied by the page. Moreover, because the content nodes outside the current display area are hidden rather than being deleted directly, when the user switches the current display area again to browse page content of the hidden content nodes, hidden node content may be switched quickly to a display state, which is very convenient and provides a faster speed.

Further, to avoid that excessive content nodes are loaded simultaneously, a maximum value is set for the number of displayed and hidden content nodes.

Content nodes farthest away from the current display area are deleted in certain order when the number of the hidden content nodes and the displayed content nodes exceeds a preset value.

For example, a preset maximum value is N, and a total number of the displayed content nodes and the hidden content nodes is M, that is, the number of loaded content nodes is M. When M≤N, content nodes outside the current display area are hidden; and when M>N, content nodes farthest away from the current display area are deleted, so as to release more memory and CPU resources.

Figure 7:
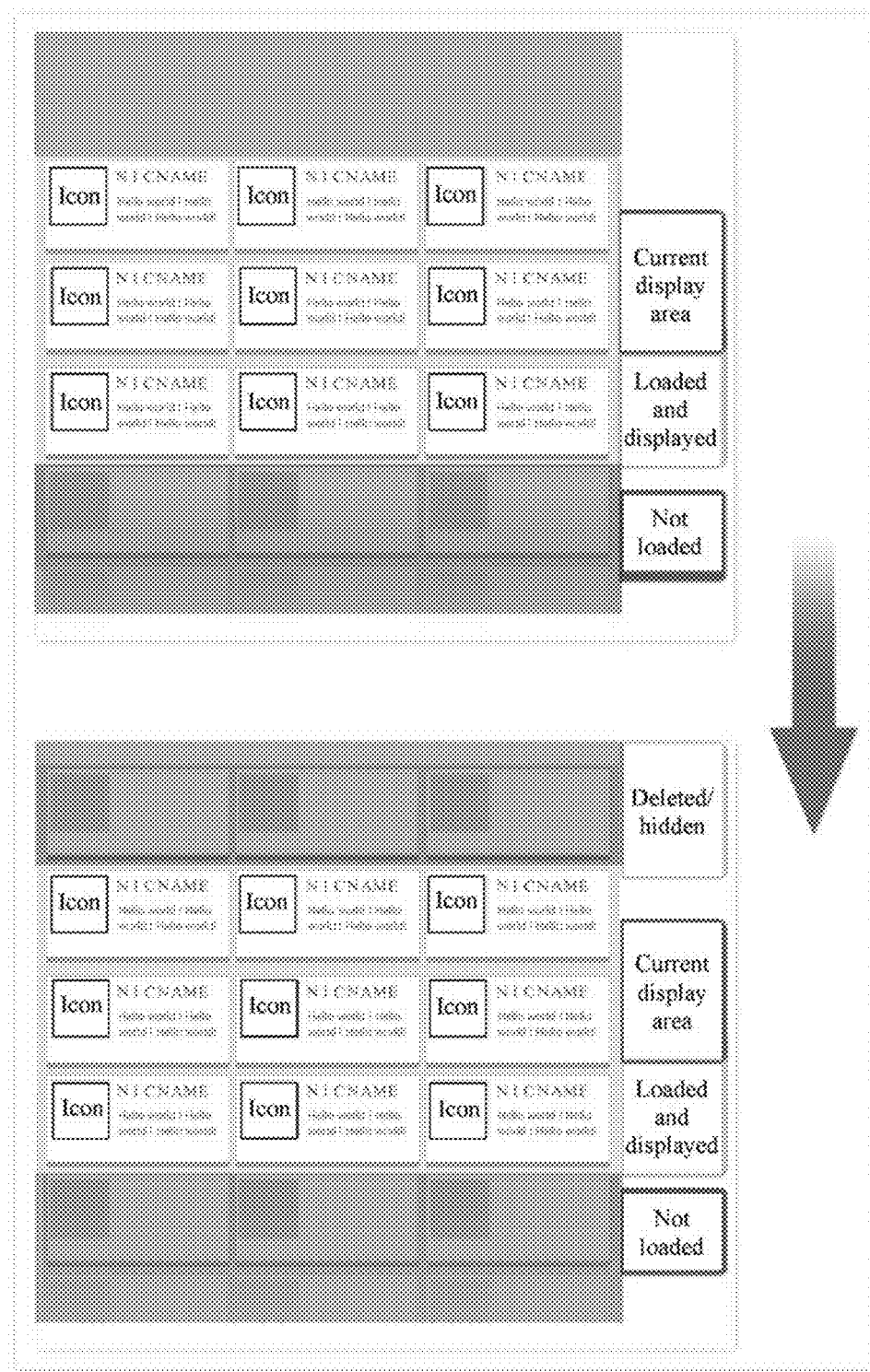
FIG. 7 is a schematic diagram of an example of the third implementation manner of the page loading method according to various embodiments of the present disclosure.

FIG. 7 is a schematic diagram of an example of the third exemplary implementation manner of the page loading method according to various embodiments of the present disclosure. As the user browses downward, page content nodes in an area above the current display area are hidden, and when the number of hidden and displayed nodes exceeds a preset value, nodes farthest away are destroyed.

The following is a fourth exemplary implementation manner of a page loading method in the present disclosure. The page loading method of the fourth implementation manner is basically the same as that of the first implementation manner, and the main difference lies in that: step S103 of acquiring data included in the page content corresponding to the current display area, and displaying the data as a corresponding content node includes the following sub-steps.

S1031: Bind a first operation event to the content node.

S1032: Trigger the first operation event when a mouse pointer moves to the content node, and bind a plurality of second operation events to the content node.

The first operation event is defined as follows: binding a plurality of second operation events to the content node when a mouse pointer moves to the content node, where the second operation event may be an operation event of click, double click, right click, or the like of a corresponding mouse and performing a corresponding operation.

For a web page that has much display content and involves complicated interaction, a performance bottleneck usually occurs. In terms of front-end display of a page, one of the important factors that affect the performance is memory occupation. Normally, memory is mainly occupied by a document object model (DOM) node from the page, and an operation event bound to the DOM node. When the number of nodes of a page exceeds a certain value, performance of the page declines sharply. Similarly, when excessive operation events are bound to the DOM node, memory occupied by the page increases greatly.

Therefore, in this implementation manner, only one operation event is bound to each content node during loading, and multiple second operation events are bound to a corresponding content node again only when the mouse pointer moves to the corresponding content node. Because relatively few operation events are bound to a node during loading, memory occupation can be reduced.

The user may first move the mouse pointer to a corresponding content node to trigger the first operation event. After corresponding second operation events are bound to the content node again, the corresponding second operation events are triggered to complete corresponding operations.

For example, 10 click operation events are bound to a node originally. According to the page loading method of this implementation manner, the 10 operation events may be bound to the node when the user moves the mouse pointer to the node, so that the number of operation events bound to a node during loading is significantly reduced, and memory occupied by the page is reduced.

The following is a fifth exemplary implementation manner of a page loading method in the present disclosure. The page loading method of the fifth implementation manner is basically the same as that of the first implementation manner, and the main difference lies in that: step S103 of acquiring data included in the page content corresponding to the current display area, and displaying the data as a corresponding content node includes the following sub-steps.

S1033: Bind a third operation event to the content node.

S1034: Trigger the third operation event when the content node is selected, and perform, according to location information of a selection operation and location information of each sub-node, an operation corresponding to the sub-node.

In this implementation manner, the third operation event is defined as follows: when the content node is selected, performing, according to location information of a selection operation and location information of each sub-node, an operation corresponding to the sub-node. The third operation event is not related to the first and second operation events in the fourth implementation manner, and is only named for distinguishing there-between. The selection operation includes an operation such as click, double click, or right click.

Operation events bound to a plurality of sub-nodes included in the content node are distinguished by using the third operation event. It is no longer necessary to bind one operation event to each of the sub-nodes; instead, it is only necessary to bind one third operation event to the content node. In this way, the number of operation events bound to a node can also be reduced, and memory occupied by the page is reduced.

For example, assuming that a node A has sub-nodes A0, A1 and A2, and the sub-nodes A0, A1 and A2 all listen to a click operation event, then there are a total of three operation events that need to be bound to the node A and the sub-nodes of the node A; however, in the page loading method of this implementation manner, a third operation event triggered by click may be bound to the node A, and when the node A is clicked, the third operation event is performed: it is determined which of A0, A1 or A2 is clicked according to a specific scenario, and further, corresponding operation processing is performed. The number of operation events bound to a node can be effectively reduced by delegating operation events.

Figure 8:
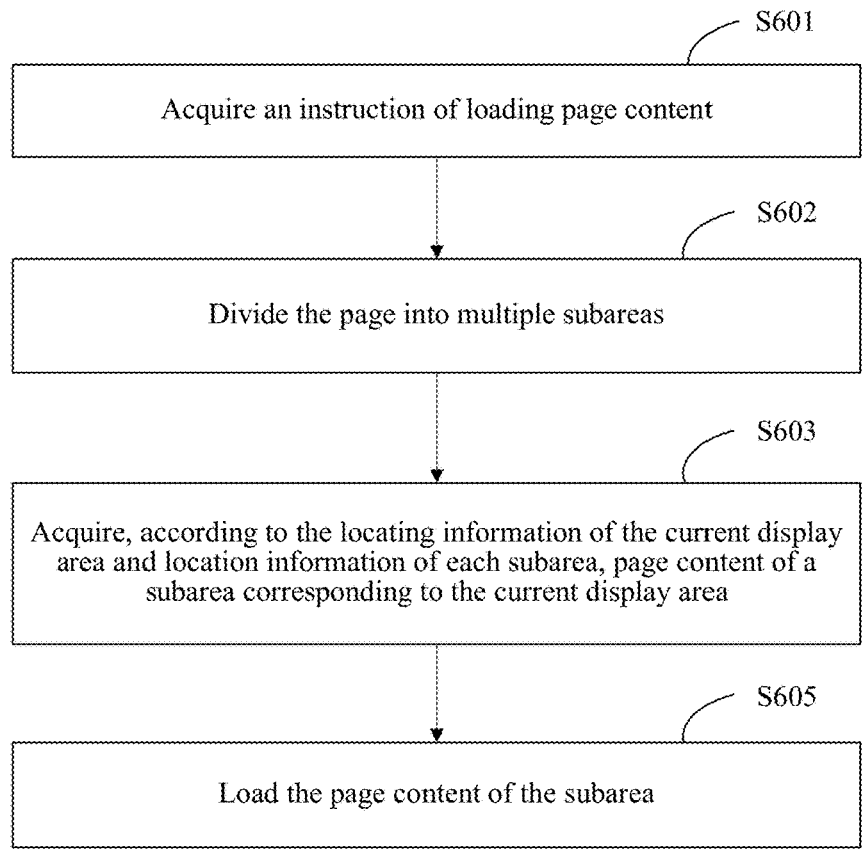
FIG. 8 is a schematic flowchart of a sixth exemplary implementation manner of a page loading method according to various embodiments of the present disclosure.

The following is a sixth exemplary implementation manner of a page loading method in the present disclosure. FIG. 8 is a schematic flowchart of a sixth implementation manner of a page loading method according to various embodiments of the present disclosure.

The page loading method of the sixth implementation manner is basically the same as that of the first implementation manner, and the main difference lies in that: the page content corresponding to the current display area is acquired and loaded in subarea division manner, which specifically includes the following steps.

S601: Acquire an instruction of loading page content.
S602: Divide the page into multiple subareas.
S603: Acquire, according to the positioning information of the current display area and location information of each subarea, page content of a subarea corresponding to the current display area.
S604: Load the page content of the subarea.

When the layout of page content is regular or page content in the subareas is closely correlated, the page may be divided into multiple subareas according to the page loading method in this implementation manner, and corresponding page content is acquired and loaded by using each subarea as a unit, so as to facilitate the user in browsing content correlated to each other in the subareas.

The following is a seventh exemplary implementation manner of a page loading method in the present disclosure.

The page loading method of the seventh implementation manner is basically the same as that of the first implementation manner, and the main difference lies in that: before the page content corresponding to the current display area is loaded, a preset background picture is displayed in the current display area.

When the background picture is set, the background picture may be displayed in a tiled manner according to an actual width and height of the current display area, and a loading prompt is provided at the same time to avoid that the page is blank before data is loaded and displayed successfully. If loading of page data in the current display area is not completed, display the tiled background picture while waiting for corresponding page content data to be returned.

Figure 9:
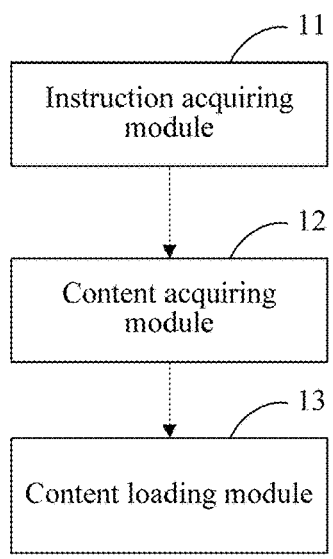
FIG. 9 is a schematic structural diagram of a page loading system according to various embodiments of the present disclosure.

FIG. 9 is a schematic structural diagram of a page loading system according to the present disclosure. The page loading system includes: an instruction acquiring module 11, configured to acquire an instruction of loading page content; a content acquiring module 12, configured to acquire positioning information of a current display area of the page, and acquire page content corresponding to the current display area according to the positioning information; and a content loading module 13, configured to load the page content corresponding to the current display area.

The instruction acquiring module 11 receives a user-triggered instruction of loading page content. Loading of the page or page content includes loading the page or page content by a user-end browser and loading specific data at a web page end. The instruction of loading page content is a signal instruction triggered by a user and for loading a corresponding page, for example, the user clicks on a corresponding web page link on a web page, or opens an indication interface of a specific application service.

The content acquiring module 12 acquires corresponding page content according to the current display area. The positioning information of the current display area of the page is used for opening location information of a display area, of a browse window (such as a browser window or a web page window) of the page, in the page to be loaded.

Preferably, the content acquiring module 12 acquires a scroll bar location of the current browse window and the width and height of a display area of the current browse window as the positioning information of the current display area.

The content loading module 13 loads the acquired page content.

An operation of loading the page content is mainly acquiring data included in the page content corresponding to the current display area, and displaying the data as a corresponding content node, such as a picture, a text, an icon, or a network link.

In the page loading system in present disclosure, positioning information of a current display area of a page is acquired; and page content corresponding to the current display area is acquired for loading from all page content to be loaded. An area selected by a user may be loaded with a high priority, without taking time to wait until loading of all previous page content is completed, which improves a speed of loading specific page content, and can implement operations such as random access to content of the page and content searching and locating.

As a preferable implementation manner of the page loading system, the content acquiring module 12 is further configured to acquire page content of a predetermined area adjacent to the current display area; and the content loading module 13 is further configured to load the page content of the predetermined area.

The page content corresponding to the current display area is loaded, and additionally, the page content of the predetermined area adjacent to the current display area is pre-loaded. If the user needs to continue to browse page content of an adjacent area after browsing the page content corresponding to the current display area, the pre-loaded page content may be displayed quickly for the user to browse, thereby improving a speed of loading and browsing a page.

There may be multiple manners for pre-loading page content, including: acquiring, by the content acquiring module, page content of a plurality of pixels that is adjacent to the current display area and is above and/or below the current display area, and using the acquired page content as the page content of the predetermined area; and/or, acquiring, by the content acquiring module, page content of a plurality of pixels that is adjacent to the current display area and is left and/or right to the current display area, and using the acquired page content as the page content of the predetermined area.

Alternatively, the content acquiring module acquires, according to a current browsing order of the page, page content of a plurality of pixels of a next display area adjacent to the current display area as the page content of the predetermined area. The page content of an adjacent area is pre-loaded, so that the user can browse the page content smoothly.

In another preferable implementation manner of the page loading system, the content loading module 13 displays content nodes included in the page content corresponding to the current display area, and hides content nodes included in page content outside the current display area.

Memory and CPU occupied by the page may be reduced, and when the user switches the current display area again to browse page content of the hidden content nodes, hidden node content may be switched quickly to a display state, which is very convenient and achieves a faster speed.

Further, to avoid that excessive content nodes are loaded simultaneously, a maximum value is set for the number of displayed and hidden content nodes, and the content loading module 13 sequentially deletes content nodes farthest away from the current display area when the number of the hidden content nodes and the displayed content nodes exceeds a preset value, so as to release more memory and CPU resources.

In another preferable implementation manner of the page loading system, the content loading module 13 is further configured to bind a first operation event to the content node; and trigger the first operation event when a mouse pointer moves to the content node, and bind a plurality of second operation events to the content node.

In this implementation manner, only one operation event is bound to each content node during loading, and multiple second operation events are bound to a corresponding content node again only when the mouse pointer moves to the corresponding content node. Because relatively few operation events are bound to a node during loading, memory occupation can be reduced.

The user may first move the mouse pointer to a corresponding content node to trigger the first operation event. After corresponding second operation events are bound to the content node again, the corresponding second operation events are triggered to complete corresponding operations.

In another preferable implementation manner of the page loading system, the content loading module 13 is further configured to bind a third operation event to the content node, trigger the third operation event when the content node is selected, and perform, according to location information of a selection operation and location information of each sub-node, an operation corresponding to the sub-node.

In this implementation manner, operation events bound to a plurality of sub-nodes included in the content node are distinguished by using the third operation event. It is no longer necessary to bind one operation event to each of the sub-nodes; instead, it is only necessary to bind one third operation event to the content node. In this way, the number of operation events bound to a node can also be reduced, and memory occupied by the page is reduced.

In still another preferable implementation manner of the page loading system, the page loading system further includes: a page division module (not shown in the figure), where the page division module is configured to divide the page into multiple subareas; the content acquiring module 12 acquires, according to the positioning information of the current display area and location information of each subarea, page content of a subarea corresponding to the current display area; and the content acquiring module 13 loads the page content of the subarea.

When the layout of page content is regular or page content in the subareas is closely correlated, the page may be divided into multiple subareas according to the page loading method in this implementation manner, and corresponding page content is acquired and loaded by using each subarea as a unit, so as to facilitate the user in browsing content correlated to each other in the subareas.

In still another preferable implementation manner of the page loading system, the content loading module 13 displays a preset background picture in the current display area before loading the page content corresponding to the current display area.

When the background picture is set, the background picture may be displayed in a tiled manner according to an actual width and height of the current display area, and a loading prompt is provided at the same time to avoid that the page is blank before data is loaded and displayed successfully. If loading of page data in the current display area is not completed, display the tiled background picture while waiting for corresponding page content data to be returned.

It may be understood by a person of ordinary skill in the art that all or some procedures and a corresponding system in the foregoing implementation manners may be implemented by a computer readable program instructing relevant hardware, and the program may be stored in a non-transitory computer-readable storage medium. When the program is executed, procedures of the disclosed implementation manners may be included. The non-transitory computer-readable storage medium may be a magnetic disk, an optical disc, a read-only memory (ROM), a random access memory (RAM), or the like. Therefore, the present disclosure further provides a storage medium including a computer readable program. When the computer readable program in the storage medium is executed, the page loading method of the present disclosure in any one of the disclosed manners may be implemented by a computer or any suitable computing device.

The disclosed method of the embodiments of the present invention may be installed in a corresponding machine device in a form of software, the disclosed page loading process is completed by controlling a relevant processing device (e.g., a processor) when the software is being running. Correspondingly, the disclosed processing device may be set and installed in a corresponding terminal device, or may be a corresponding terminal device, for example, the processing device may be any terminal device such as a mobile phone, a tablet computer, a personal digital assistant (PDA), a point of sales (POS), or an in-vehicle computer.

Therefore, based on the disclosed page loading method and system, and non-transitory computer-readable storage medium of the present disclosure, the present disclosure further provides a terminal device and a server. The terminal device may be any terminal device that may need to upgrade and update the relevant software, for example, a mobile phone, a tablet computer, a PDA, a POS, or an in-vehicle computer.

Figure 10:
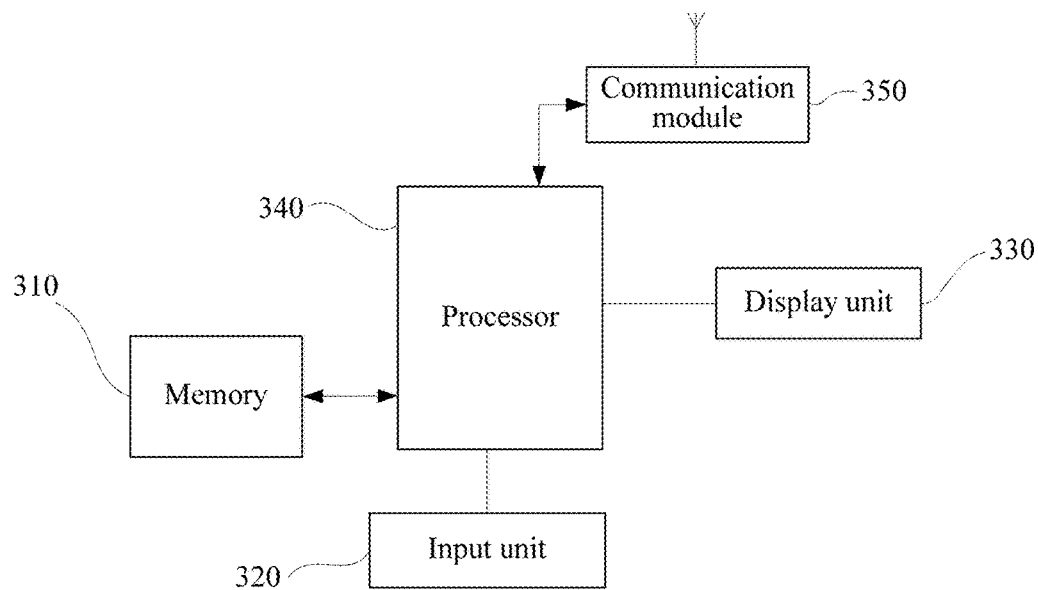
FIG. 10 is a block diagram of the structure of a part of a terminal device based on the present disclosure.

Therefore, one terminal device is used as an example below. FIG. 10 shows a block diagram of the structure of a part of the terminal device. Referring to FIG. 10, the terminal device includes components such as a memory 310, an input unit 320, a display unit 330, a processor 340, and a communication module 350. A person skilled in the art may understand that the structure shown in FIG. 10 is only a block diagram of the structure of a part related to the solutions of the embodiments of the present invention, and does not constitute a limitation to the terminal device applied in the solutions of the present disclosure. A specific terminal device may include more components or fewer components than those shown in the figure, or some components may be combined, or a different component deployment may be included.

The following specifically describes the components of the terminal device with reference to FIG. 10. The memory 310 may be configured to store a software program and module. The processor 340 runs the software program and module stored in the memory 310, to implement various functional applications and data processing related to the terminal device. The memory 310 may mainly include a program storage area and a data storage area. The program storage area may store an operating system, an application program required by at least one function (such as a sound playback function and an image display function), and the like. The data storage area may store data created according to use of the terminal device, and the like. In addition, the memory 310 may include a high speed random access memory, and may also include a non-volatile memory such as at least one magnetic disk storage device, a flash memory, or another volatile solid-state storage device.

The input unit 320 may be configured to receive input digit, character or other information, and generate a keyboard signal input related to the user setting and function control of the terminal device. Specifically, in the solutions of the embodiments of the present invention, the input unit 320 may be configured to receive an instruction of loading page content, and acquire positioning information of a current display area of the page.

Specifically, by using the terminal device being a mobile phone as an example, the input unit 320 may include a touch panel and another input device. The touch panel, which may also be referred to as a touch screen, may collect a touch operation of a user on or near the touch panel (such as an operation of a user on or near the touch panel by using any suitable object or accessory such as a finger or a stylus), and drive a corresponding connection apparatus according to a preset program. Optionally, the touch panel may include two parts: a touch detection apparatus and a touch controller. The touch detection apparatus detects a touch position of the user, detects a signal generated by the touch operation, and transfers the signal to the touch controller. The touch controller receives touch information from the touch detection apparatus, converts the touch information into touch point coordinates, and sends the touch point coordinates to the processor 340. Moreover, the touch controller can receive and execute a command sent from the processor 340. In addition, the touch panel may be a resistive, capacitive, infrared, or surface sound wave type touch panel. In addition to the touch panel, the input unit 320 may further include another input device. Specifically, the another input device may include, but is not limited to, one or more of a physical keyboard, a functional key (such as a volume control key or a switch key), a track ball, a mouse, and a joystick.

The display unit 330 may be configured to display information input by the user or information provided for the user, and various menus. The display unit 330 may include a display panel. Optionally, the display panel may be configured by using a liquid crystal display (LCD), an organic light-emitting diode (OLED), or the like. Specifically, in this embodiment, the display unit 330 may be used to display page content corresponding to a current display area specified by the user, and prompt the page content to the user, so that the user specifies page content that needs to be loaded and displayed quickly.

The terminal device may implement communication between the server by using the communication module 350. The communication module 350 may be implemented in any possible implementation manner, such as a WiFi module, Bluetooth communication, or optical fiber communication. Communication between the terminal device and the server is implemented by using the communication module 350, so that the terminal device can send related information to the server (for example, in the embodiments of the present invention, send a request for acquiring page content corresponding to the current display area), and receive related information returned by the server (for example, the page content corresponding to the current display area returned by the server).

The processor 340 is the control center of the terminal device, and is connected to various parts of the terminal device by using various interfaces and lines. By running or executing the software program and/or module stored in the memory 310, and invoking data stored in the memory 310, the processor 340 performs various functions and data processing of the terminal device, thereby performing overall monitoring on the terminal device. Optionally, the processor 340 may include one or more processing units.

Figure 11:
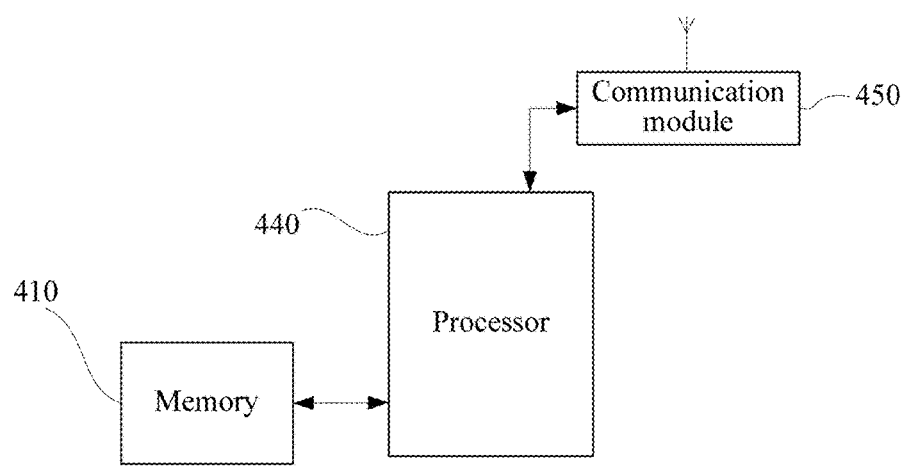
FIG. 11 is a block diagram of the structure of a part of a server based on the present disclosure.

Similarly, FIG. 11 shows a frame structure included in a server in a specific example. Referring to FIG. 11, the server includes components such as a memory 410, a processor 440, and a communication module 450. A person skilled in the art may understand that the structure shown in FIG. 11 shows only a part related to the solutions of the present disclosure, and does not constitute a limitation to the server applied in the solutions of the present disclosure. A specific server may include more components or fewer components than those shown in the figure, or some components may be combined, or a different component deployment may be used.

The memory 410 may be configured to store a software program and module. The processor 440 runs the software program and module stored in the memory 410, to implement various functional applications and data processing related to the server, for example, acquire corresponding page content based on a request for specified page content. The memory 410 may mainly include a program storage area and a data storage area. The program storage area may store an operating system, and an application program required by at least one function. The data storage area may store data created according to use of the server, and the like.

The server may implement communication between the terminal device by using the communication module 450. The communication module 450 may be implemented in any possible implementation manner, such as a WiFi module, Bluetooth communication, or optical fiber communication. Communication between the terminal device and the server is implemented by using the communication module 450, so that the server can receive related information sent by the terminal device (for example, in the embodiments of the present invention, receive a request for specific page content), and return information related to the request to the terminal device (for example, deliver the page content corresponding to the request).

The processor 440 is the control center of the server, and is connected to various parts of the server by using various interfaces and lines. By running or executing the software program and/or module stored in the memory 410, and invoking data stored in the memory 410, the processor 440 performs various functions and data processing of the server, thereby performing overall monitoring on the server. Optionally, the processor 440 may include one or more processing units.

The foregoing embodiments only describe several implementation manners of the present disclosure, and their description is specific and detailed, but cannot therefore be understood as a limitation to the patent scope of the present disclosure. It should be noted that a person of ordinary skill in the art may further make variations and improvements without departing from the conception of the present disclosure, and all these variations and improvements fall within the protection scope of the present disclosure. Therefore, the patent protection scope of the present disclosure should be subject to the appended claims.

What is claimed is:

1. A page loading method, comprising:
acquiring an instruction of loading page content;
acquiring positioning information of a current display area of a page, and acquiring page content corresponding to the current display area according to the positioning information;
loading the page content corresponding to the current display area; and
performing a page content pre-loading for a predetermined area adjacent to the current display area by:
determining page content within a predetermined number of pixels above and below the current display area, and pre-loading the page content within the predetermined number of pixels; and
determining a browsing trend of the page according to operation trajectory tracking, and acquiring and pre-loading page content of a next display area according to the browsing trend.

2. The page loading method according to claim 1, further comprising:
determining and pre-loading page content of a predetermined number of pixels that is adjacent to the current display area and is left and/or right to the current display area.

3. The page loading method according to claim 1, wherein loading the page content corresponding to the current display area comprises:
acquiring data comprised in the page content corresponding to the current display area, and displaying the data as a corresponding content node.

4. The page loading method according to claim 3, further comprising, after loading the page content corresponding to the current display area:
displaying content nodes comprised in the page content corresponding to the current display area; and
hiding content nodes comprised in page content corresponding to an area of the page other than the current display area.

5. The page loading method according to claim 4, further comprising:
sequentially deleting content nodes farthest away from the current display area when the number of the hidden content nodes and the displayed content nodes exceeds a preset value.

6. The page loading method according to claim 3, wherein acquiring the data comprised in the page content corresponding to the current display area, and displaying the data as the corresponding content node comprise:
binding a first operation event to the content node; and
triggering, when a mouse pointer moves to the content node, the first operation event to bind a plurality of second operation events to the content node.

7. The page loading method according to claim 3, wherein acquiring the data comprised in the page content corresponding to the current display area, and displaying the data as the corresponding content node further comprise:
binding a third operation event to the content node, triggering the third operation event when the content node is selected, and
performing, according to location information of a selection operation and location information of a sub-node of the content node, an operation corresponding to the sub-node.

8. The page loading method according to claim 1, further comprising:
dividing the page into multiple subareas;
acquiring, according to the positioning information of the current display area and location information of each subarea, page content of a subarea corresponding to the current display area; and
loading the page content of the subarea.

9. The page loading method according to claim 1, further comprising:
before the loading of the page content corresponding to the current display area, displaying a preset background picture in the current display area.

10. The page loading method according to claim 1, wherein the positioning information of the current display area comprises a scroll bar location of a current browse window and the width and height of a display area of the current browse window.

11. A page loading system, comprising:
a processor; and
a memory storing a software program that, when executed by the processor, cause the processor to:
acquire an instruction of loading page content;
acquire positioning information of a current display area of a page, and acquiring page content corresponding to the current display area according to the positioning information;
load the page content corresponding to the current display area; and
perform a page content pre-loading for a predetermined area adjacent to the current display area by:
determining page content within a predetermined number of pixels above and below the current display area, and pre-loading the page content within the predetermined number of pixels; and
determining a browsing trend of the page according to operation trajectory tracking, and acquiring and pre-loading page content of a next display area according to the browsing trend.

12. The page loading system according to claim 11, wherein the soft program further causes the processor to:
acquire data comprised in the page content corresponding to the current display area, and display the data as a corresponding content node.

13. The page loading system according to claim 12, wherein the soft program further causes the processor to, after loading the page content corresponding to the current display area:
display content nodes comprised in the page content corresponding to the current display area; and
hide content nodes comprised in page content corresponding to an area of the page other than the current display area.

14. The page loading system according to claim 13, wherein the soft program further causes the processor to:
sequentially delete content nodes farthest away from the current display area when the number of the hidden content nodes and the displayed content nodes exceeds a preset value.

15. The page loading system according to claim 12, wherein the soft program further causes the processor to:

bind a first operation event to the content node; and
trigger, when a mouse pointer moves to the content node, the first operation event to bind a plurality of second operation events to the content node.

16. The page loading system according to claim 12, wherein the soft program further causes the processor to:
bind a third operation event to the content node,
trigger the third operation event when the content node is selected, and
perform, according to location information of a selection operation and location information of a sub-node of the content node, an operation corresponding to the sub-node.

17. The page loading system according to claim 11, wherein the soft program further causes the processor to:
divide the page into multiple subareas;
acquire, according to the positioning information of the current display area and location information of each subarea, page content of a subarea corresponding to the current display area; and
load the page content of the subarea.

18. The page loading system according to claim 11, wherein the soft program further causes the processor to:
before the loading of the page content corresponding to the current display area, display a preset background picture in the current display area.

19. The page loading system according to claim 11, wherein the positioning information of the current display area comprises a scroll bar location of a current browse window and the width and height of a display area of the current browse window.

20. A non-transitory computer-readable storage medium comprising a computer readable program stored thereon, wherein, when being executed, the computer readable program causes a computer to:
acquire an instruction of loading page content;
acquire positioning information of a current display area of a page, and acquiring page content corresponding to the current display area according to the positioning information;
load the page content corresponding to the current display area; and
perform a page content pre-loading for a predetermined area adjacent to the current display area by:
determining page content within a predetermined number of pixels above and below the current display area, and pre-loading the page content within the predetermined number of pixels; and
determining a browsing trend of the page according to operation trajectory tracking, and acquiring and pre-loading page content of a next display area according to the browsing trend.

* * * * *